Nov. 11, 1952 W. J. PEETS 2,617,375
ELECTRIC MOTOR DRIVE FOR SEWING MACHINES
Filed Sept. 17, 1947 3 Sheets-Sheet 1

WITNESS.
N. Leszczak

INVENTOR.
Wilbur J. Peets
BY
William P. Stewart
ATTORNEY.

Nov. 11, 1952     W. J. PEETS     2,617,375
ELECTRIC MOTOR DRIVE FOR SEWING MACHINES
Filed Sept. 17, 1947     3 Sheets-Sheet 3

WITNESS.
N. Leszczak

INVENTOR.
Wilbur J. Peets
BY
William P. Stewart
ATTORNEY.

UNITED STATES PATENT OFFICE 2,617,375

ELECTRIC MOTOR DRIVE FOR SEWING MACHINES

Wilbur J. Peets, Elizabeth, N. J., assignor to The Singer Manufacturing Company, Elizabeth, N. J., a corporation of New Jersey Application September 17, 1947, Serial No. 774,597

6 Claims. (Cl. 112—220)

This invention relates to driving means for sewing machines and more particularly to electric motor driving means housed in the frame of a family-type sewing machine.

An object of the invention is to provide an improved sewing machine and motor drive unit construction.

A specific object of the invention is to provide improved means for mounting an electric motor in the bracket-arm standard of a family-type sewing machine; the motor being completely housed within and insulated from the sewing machine frame.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

Figure 1:
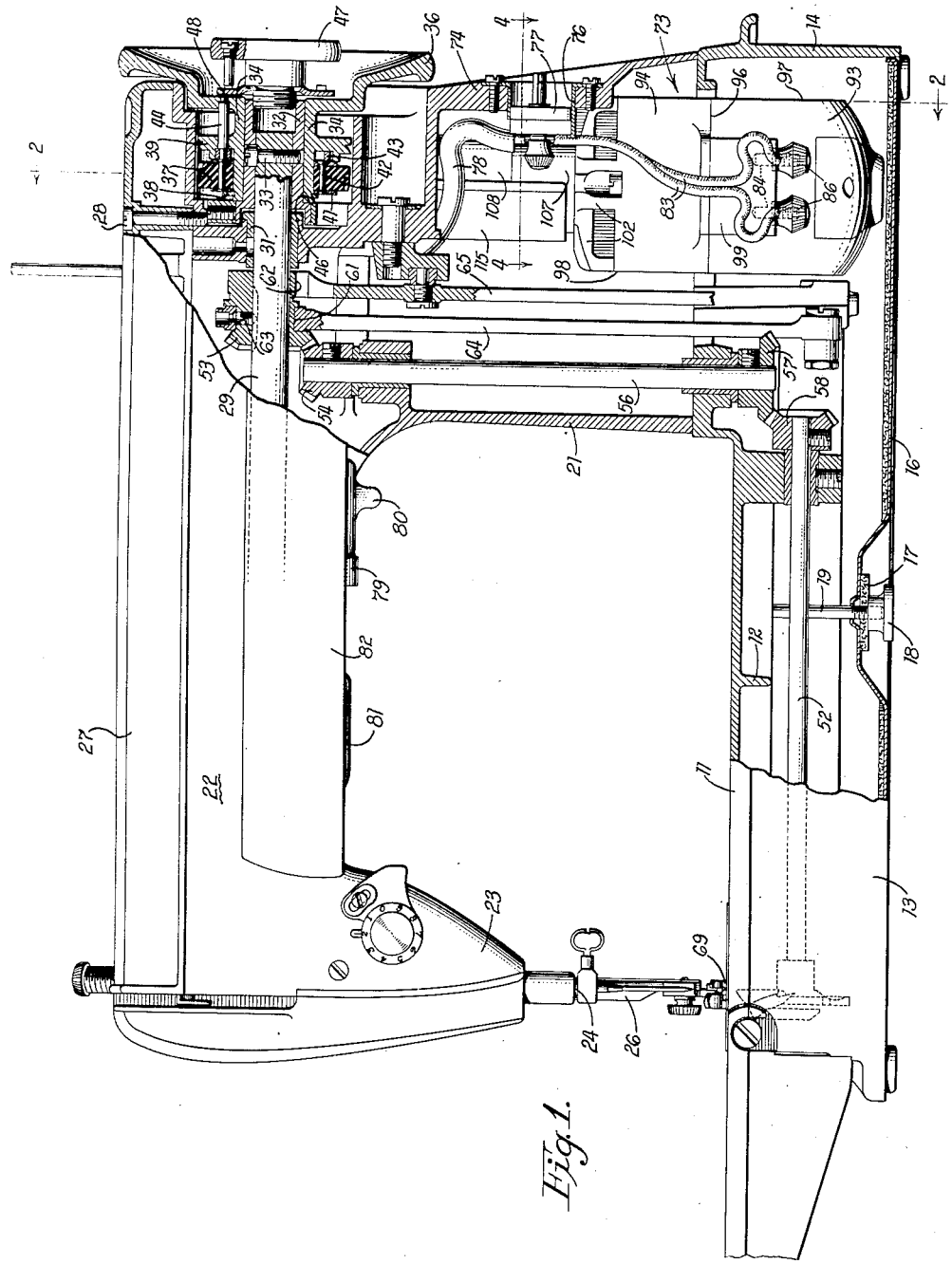
Fig. 1 is a front elevational view of a sewing machine embodying the invention, portions being broken away to show certain operating parts and their supports.

As illustrated in the drawings, the frame of the sewing machine comprises a substantially rectangularly shaped bed-plate or base 11, forming on its upper side a work-supporting plate and provided on its under face with a plurality of transversely and longitudinally arranged strengthening ribs 12, downwardly extending side-walls 13 and end walls, as 14, forming a boxlike enclosure, the downwardly facing opening of which is normally closed by a bottom cover plate 16 held in place by a washer 17 and nut 18; the latter being threaded on a stud 19 extending downwardly from the under face of the base 11.

Suitably secured upon the hollow bed 11 is a vertically disposed hollow standard 21 which carries an overhanging bracket-arm 22 terminating in a hollow head 23 in which is mounted the usual reciprocatory needle-bar 24 and presser-bar 26. The upper part of the bracket-arm 22 is closed by a cover-plate 27 held in place by screws, as 28. A main driving shaft 29, disposed within and lengthwise of the overhanging bracket-arm 22, is journaled in bearings of which one is shown at 31. The arm-standard end of the shaft 29 carries a sleeve 32 secured thereto by a screw 33. A hub-extension 34 of a hand-wheel 36 is rotatably mounted on this sleeve 32. A laminated impregnated-fabric driven gear 37 is freely mounted on the hub-extension 34 and is held against longitudinal movement by a split spring-ring 38 and a flange 39 of the hub 34. The gear 37 is shrouded by a pair of spaced rings 41 held together by rivets 42. The gear 37, in a manner similar to that shown and described in Patent No. 1,934,373, issued November 7, 1933, has a pin (not shown) projecting from one side face thereof. This pin (not shown) is connected by a circular spring 43 with a pin 44 carried by the flange 39. The sleeve 32, in a manner similar to that shown in Patent No. 1,934,373, is formed with a shoulder 46 against which an end of the hub-extension 34 is clamped by a manually operated clutch screw 47. The clutch-screw is threaded into the outer end of the sleeve 32 and, in cooperation with a washer 48, having tongues which enter keying notches in the sleeve 32, functions to connect the shaft 29 to the driven hand wheel 36.

The main shaft 29, in a well known manner, drives the needle-bar 24 carried in the head 23. A loop-taker actuating shaft 52, journaled in the base 11, is driven by the main shaft 29 through bevel gears 53 and 54, vertical shaft 56 and bevel gears 57 and 58. A pair of actuating eccentrics 61 and 62 are formed integral with the gear 53 and the combination is held in place by a set screw 63. The eccentrics 61 and 62 actuate pitmans 64 and 65 respectively and these in turn actuate rock shafts 67 and 68 which impart the usual feeding movements to a feed dog 69.

Figure 4:
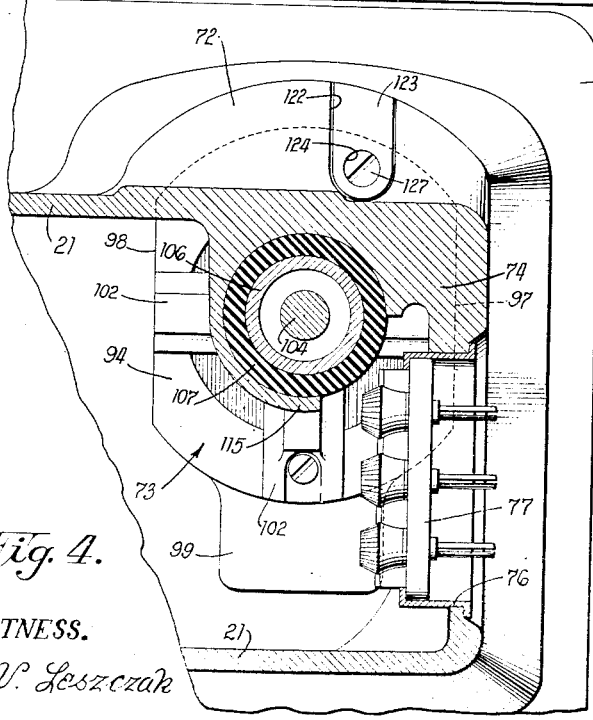
Fig. 4 is a fragmentary sectional view taken on the line 4—4 of Fig. 1.
Figure 5:
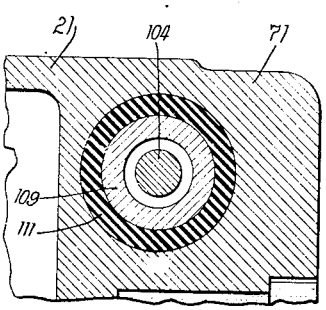
Fig. 5 is a fragmentary sectional view along the line 5—5 of Fig. 2.

The arm-standard 21 is especially designed to provide adequate space for housing sewing machine parts. To this end, the arm-standard is made in substantially the shape of a pyramid, the lower portion of the standard being larger than the upper portion. A back portion 71 of the standard 21 has an enlarged offset portion 72 (Figs. 2, 4) and this offset portion, together with the otherwise enlarged pyramidal base of the standard provides space for housing a vertically disposed electric motor 73.

The right side 74 (Fig. 1) of the arm-standard 21 has an aperture 76 arranged to receive a flush-type, three-pin terminal 77. A two-conductor electric cord 78 connects the two outer contacts of the terminal 77 to a lamp socket 79, having a switch 80 and carrying a lamp bulb 81; the latter being protected by a shield 82. Two electrical conductors 83, housed entirely within the machine frame, connect the central contact and one of the outer contacts of the terminal 77, to a pair of contacts 84 carried by the motor 73. Each of the motor contacts 84 is covered with an insulating nut 86.

The electric motor 73 has a lower enclosing frame member or end-bonnet 93 made from a non-conducting plastic, whereas an upper enclosing frame member or end-bonnet 94 is made from aluminum; the two being joined on a horizontal line indicated by the numeral 96. Both of the frame members have opposed flattened sides 97 and 98, thus making it possible to install the motor in a small space. The lower member 93 has an integrally formed terminal box 99 which supports the downwardly disposed contacts 84. The upper portion 94 has a lug 101 (Fig. 2) which has a threaded hole 100 that is parallel to the axis of the motor 73. The upper portion 94 is formed with a four-armed spider 102 that supports a concentric upstanding, hollow, tubular stem 103 through which extends and by means of a bearing (not shown) rotatably supports an elongated motor shaft 104. The external surface (Fig. 2) of the stem 103 is shouldered to form a lower cylindrical neck 106 which carries a cylindrical insulating bushing 107, a reduced intermediate and upwardly tapered portion 108, and an upper and further reduced cylindrical neck 109 which carries a cylindrical insulating bushing 111 of a diameter slightly less than the outer diameter of the lower bushing 107. An armature 110 is rotatably supported in the motor frame on the shaft 104 and the upper end of said shaft carries an elongated worm 112 held thereto by a set screw 113.

Internally of the arm-standard 21, there is provided a vertically disposed cylindrical recess or well 114 partly formed by a segmental wall 115. The well is formed to provide an upper cylindrical surface 116 of reduced diameter, an intermediate enlarged surface 117, and a still further enlarged lower cylindrical surface 118; the upper and lower cylindrical surfaces being coaxially arranged, vertically spaced and of such size as respectively to form seats for the upper and lower cylindrical bushings 111 and 107 carried by the motor stem 103. Since the upper and lower surfaces 116 and 118, and the bushings 111 and 107 are cylindrical in form, and since the lower surface 118 and lower bushing 107 are diametrically larger than the upper surface 116 and upper bushing 111, there is provided a combination of a motor and a frame into which frame the motor can easily be inserted and from which frame the motor can easily be removed. The surfaces 116 and 118 and the bushings 111 and 107 are so constructed and arranged that, when the motor 73 is in place, the worm 112 meshes with the worm gear 37 of the sewing machine drive. This construction necessitates that the upper end of the well 114 be located adjacent the worm gear 37. Thus, the inner wall of the hollow standard 21 defines a vertically elongated compartment and the well 114 is formed in a secondary wall structure 115 which projects laterally from the inner wall of the standard and into the confines of the standard compartment. Furthermore, the apertured vertical portions of this secondary wall, containing the shaft bushing 31, forms, with the horizontal portion of the secondary wall, containing the well 114, a chamber in which is housed the gear wheel 37 and the balance-wheel clutch.

The offset portion 72 of the sewing machine standard is provided (Figs. 2 and 4) with a radially disposed external recess 122 which carries an insulating insert 123 having a vertically disposed countersunk hole 124. The bottom wall of the recess 122 is apertured by an enlarged hole 126 and, when the sewing machine motor 73 is in operating position, a single screw 127 passes downwardly through the hole 124, the hole 126, through a hole in an insulating washer 128, hereinafter referred to, and is screwed into the threaded hole 100 of the motor frame member 94. Within limits, the relative vertical position of the worm 112 with respect to the gear 37 is not critical, and the vertical position of the motor 73 is governed entirely by the axial length of the washer 128, the position of the abutting surface surrounding the lower end of the hole 126 and the position of an abutting surface surrounding the upper end of the hole 100.

The motor herein described can be quickly installed in the sewing machine standard and removed therefrom with a minimum of effort. To remove the motor 73 from the sewing machine, an operator removes the thumb nut 18 and the bottom cover 16. Then the conductors 83 are disconnected from the contacts 84. Next the screw 127 is loosened. When the screw 127 becomes completely disengaged from the hole 100 in the upper member 94, the motor 73 is completely free to be withdrawn from the sewing machine frame.

It will be noted that the motor 73 is completely insulated from the frame of the sewing machine. The two insulating bushings 107 and 111, insulate the stem 103 of the motor from the sewing machine frame, and the metallic worm 112 is insulated from the sewing machine by the insulating from the sewing machine by the insulating gear 37. Furthermore, the insulating insert 123 and the insulating washer 128, together with enlarged hole 126 insulate the motor from the sewing machine at the point where the two are held together by the screw 127. Since the lower end frame 93 is made from an insulating material, there is no danger of a person getting a shock from the motor, even when the motor is in place and the lower cover 16 of the sewing machine is removed for the purpose of making inspection of, or repairs to, other parts of the sewing machine mechanism.

Figure 2:
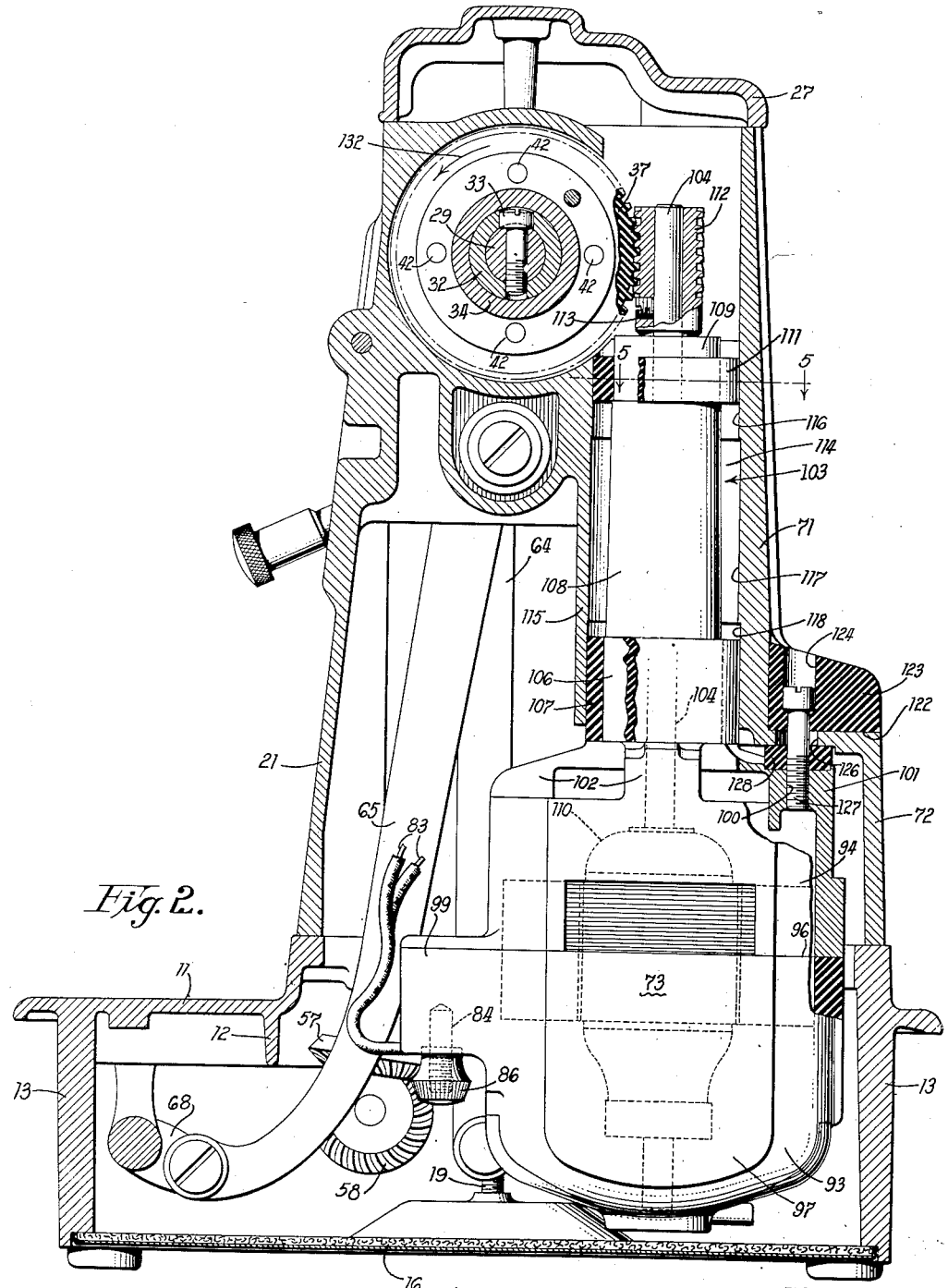
Fig. 2 is a view taken substantially on the line 2—2 of Fig. 1 and looking in the direction of the arrows.
Figure 3:
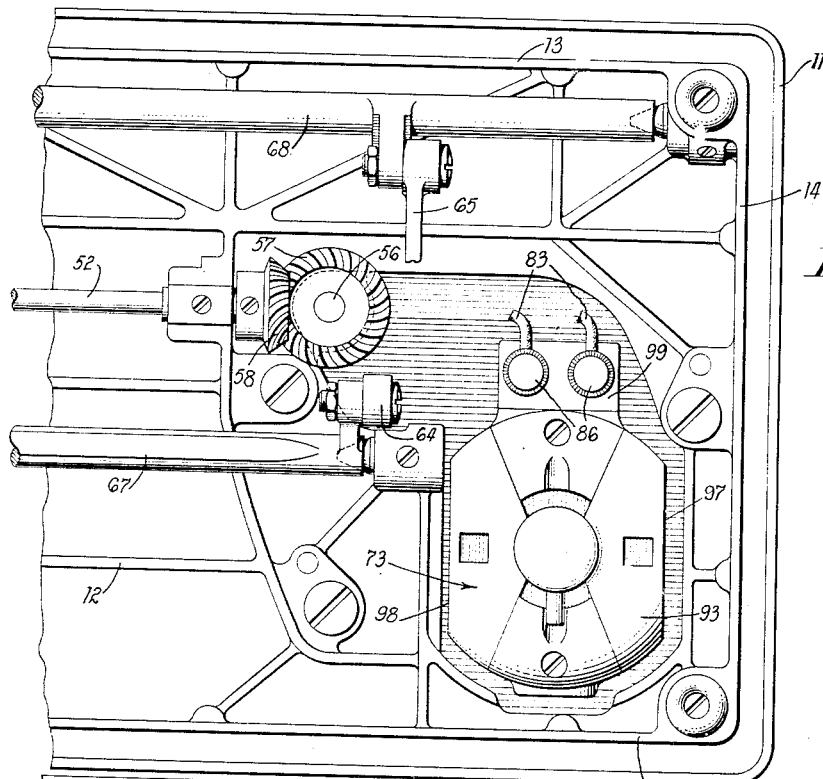
Fig. 3 is a fragmentary bottom plan view of the sewing machine shown in Figs. 1 and 2, the bottom cover having been removed.

As indicated by the arrow 132 in Fig. 2, the worm 112 drives the gear 37 in a counterclockwise direction. This creates a downwardly directed component of force in the worm 112 and the shaft 104. This force and a force caused by the weight of the motor shaft 104, worm 112, and motor armature 110 add to produce a downwardly directed thrust on the bearing which support the shaft 104. Since these forces are additive and not subtractive, the possibility of "hunting" between two forces is eliminated.

Having thus set forth the nature of the invention, what I claim herein is:

1. In a sewing machine having a frame including a base and a bracket-arm having a hollow standard rising from said base and together therewith forming a vertically disposed compartment extending entirely through the bottom of said base; a horizontally disposed upper rotary shaft journaled in and extending lengthwise of said bracket-arm; a horizontally disposed lower rotary shaft journaled in and extending lengthwise of said base; driving connections between said shafts including a shaft vertically disposed in said standard; a vertically apertured supporting wall extending inwardly from the upper portion of said standard into said compartment; and a unitary driving structure disposed in said compartment and spaced horizontally from said driving connections for removal of said structure endwise from said compartment through said base, said driving structure comprising a vertical-axis electric motor having a frame disposed in the lower portion of said compartment and an upwardly extending reduced frame-portion seated in the vertical aperture of said supporting wall, a vertically disposed motor-shaft journaled in said reduced frame-portion and having its axis of rotation offset laterally from the horizontal axis of rotation of said upper shaft; intermeshing driving and driven gears carried by said motor shaft and said upper shaft; and means removably securing said driving structure in operative position in said compartment.

2. In a sewing machine having a frame including a horizontally extending hollow base with a vertically disposed hollow standard rising from one end portion of said base, the inner walls of said standard and base together forming a vertically disposed compartment which extends entirely through the bottom of said frame base; an arm projecting laterally from the upper end of said standard; an upper rotary shaft journaled in and extending lengthwise of said arm; a driven gear carried by said upper shaft over said compartment; a lower rotary shaft journaled in and extending lengthwise of said base at one side of the lower end of said compartment; and driving means disposed within and at one side of said compartment and connecting said upper and lower shafts for rotation in a fixed timing relationship; the combination therewith of a secondary wall projecting from the inner standard wall and into the confines of said compartment at the junction of said arm and standard, said secondary wall depending downwardly into said compartment and having a substantially vertically disposed bore running lengthwise therethrough with the length of said bore being substantially greater in dimension than the greatest lateral diameter thereof; a unitary driving structure including an electric motor having a motor casing vertically disposed within the lower portion of said compartment adjacent said driving means, an elongated stem projecting axially from said casing and provided with a peripheral bearing surface complemental in size to the internal wall of said bore with the length of said stem being at least equal to one-half the axial length of the motor casing proper, an elongated motor shaft journaled within and projecting from the free end of said stem, and a driving gear carried upon the distal end of said motor shaft, said driving structure normally being removably disposed within said compartment with its stem being slidingly received lengthwise of and within said bore; and means carried by said frame for maintaining said stem in mating relation with said bore thereby to position said two gears in mesh.

3. A sewing machine comprising in combination a frame including a horizontally extending hollow base with a vertically disposed hollow standard rising from one end portion of said base, the inner walls of said standard and base together forming a vertically disposed compartment which extends entirely through the bottom of the frame base, and an arm projecting laterally from the upper end of said standard; an upper rotary shaft journaled in and extending lengthwise of said arm; a secondary wall projecting laterally from the inner standard wall and into the confines of said compartment at the junction of said arm and standard, said secondary wall depending downwardly into said compartment and having a substantially vertically disposed and downwardly progressively enlarged bore running lengthwise therethrough with its longitudinal axis horizontally spaced from the longitudinal axis of said upper shaft; a driven wheel gear carried by said upper shaft adjacent the upper end of said bore; a unitary driving structure including an electric motor having a motor casing vertically disposed within the lower portion of said compartment, an elongated stem projecting axially in a progressively reduced manner from said casing and provided with a peripheral bearing surface complemental in size to the internal wall of said bore but having its greatest lateral dimension substantially less than the smallest lateral dimension of the motor casing, an elongated motor shaft journaled within and projecting from the free end of said stem, and a driving worm gear carried upon the distal end of said motor shaft, said driving structure normally being removably disposed within said compartment with its stem being slidingly received lengthwise of and within said bore; means removably to maintain said stem in a mating relation with said bore thereby to position said driving and driven gears in mesh; a lower rotary shaft journaled in and extending lengthwise of said base; and driving means disposed within said standard compartment and connecting said upper and lower shafts for rotation in a fixed timing relationship, said lower shaft and said driving means being located entirely at one side of said motor casing so that the unitary driving structure may be inserted into and removed from said compartment by way of said base.

4. In a sewing machine having a frame including a horizontally extending hollow base with a vertically disposed hollow standard rising from one end portion of said base, the inner walls of said standard and base together forming a vertically disposed compartment which extends entirely through the bottom of said frame base; an arm projecting laterally from the upper end of said standard; an upper rotary shaft journaled in and extending lengthwise of said arm; a driven wheel gear carried by said upper shaft over said compartment; a lower rotary shaft journaled in and extending lengthwise of said base at one side of the lower end of said compartment; and driving means disposed within and at one side of said compartment and connecting said upper and lower shafts for rotation in a fixed timing relationship; the combination therewith of a secondary wall projecting laterally from the inner standard wall and into the confines of said compartment at the junction of said arm and standard, said secondary wall depending downwardly into said compartment and having a substantially vertically disposed and downwardly progressively reduced stepped bore running lengthwise therethrough with the length of said bore being substantially greater in dimension than the greatest lateral diameter thereof and with its longitudinal axis being horizontally spaced from the longitudinal axis of said upper shaft; a unitary driving structure including an electric motor having a motor casing vertically disposed within the lower portion of said compartment adjacent said driving means, an elongated stepped stem projecting axially in a progressively reduced manner from said casing and provided with a peripheral bearing surface complemental in size to the internal wall of said bore with the length of said stem being at least equal to one-half the axial length of the motor casing proper, an elongated motor shaft journaled within and projecting from the free end of said stem, and a driving worm gear carried upon the distal end of said motor shaft, said driving structure normally being removably disposed within said compartment with its stem being slidingly received lengthwise of and within said bore; and means carried by said frame for maintaining said stem in a mating relation with said bore thereby to position said wheel and worm gears in mesh.

5. A sewing machine comprising in combination a frame including a horizontally extending hollow base with a vertically disposed hollow standard rising from one end portion of said base, the inner walls of said standard and base together forming a vertically disposed compartment which extends entirely through the bottom of the frame base, and an arm projecting laterally from the upper end of said standard; a secondary wall projecting laterally from the inner standard wall and into the confines of said compartment and having a vertical portion and a horizontal portion which form with said inner standard wall a chamber interiorly of said standard compartment, said vertical wall portion being formed with a horizontally extending aperture, said horizontal wall portion being formed with a depending member which extends downwardly into said compartment and has a vertically disposed and downwardly progressively enlarged bore running lengthwise therethrough with its longitudinal axis horizontally spaced from that of said aperture; an upper rotary shaft disposed within and lengthwise of said arm and having one end portion thereof extending into said chamber and being journaled within said aperture; a driven wheel gear carried by said upper shaft and disposed within said chamber adjacent the upper end of said bore; a unitary driving structure including an electric motor having a motor casing small enough to be vertically disposed within the lower portion of said compartment, an elongated stem projecting axially in a progressively reduced manner from said casing and provided with a peripheral bearing surface complemental in size to the internal wall of said bore but having its greatest lateral dimension substantially less than the smallest lateral dimension of the motor casing, an elongated motor shaft journaled within and projecting from the free end of said stem, and a driving work gear carried upon the distal end of said motor shaft, said driving structure normally being removably disposed within said compartment with its stem being slidingly received lengthwise of and within said bore; means removably to maintain said stem in a mating relation with said bore thereby to position said worm gear within said chamber and in mesh with said wheel gear; a lower rotary shaft journaled in and extending lengthwise of said base; and driving means disposed within said standard compartment and connecting said upper and lower shafts for rotation in a fixed timing relationship, said lower shaft and said driving means being located entirely at one side of said motor casing so that the unitary driving structure may be inserted into and removed from said compartment by way of said base.

6. A sewing machine comprising in combination a frame including a horizontally extending hollow base with a vertically disposed hollow standard rising from one end portion of said base, the inner walls of said standard and base together forming a vertically disposed compartment which extends entirely through the bottom of said frame base, and an arm projecting laterally from the upper end of said standard; an upper rotary shaft journaled in and extending lengthwise of said arm; a driven gear carried by said upper shaft over said compartment; a secondary wall projecting from the inner standard wall and into the confines of said compartment at the junction of said arm and standard, said secondary wall depending downwardly into said compartment and having a substantially vertically disposed bore running lengthwise therethrough with the length of said bore being substantially greater in dimension than the greatest lateral diameter thereof; a unitary driving structure including an electric motor having a motor casing vertically disposed within the lower portion of said compartment, an elongated stem projecting axially from said casing and provided with a peripheral bearing surface of electrical insulating material complemental in size to the internal wall of said bore with the length of said stem being at least equal to one-half the axial length of the motor casing proper, an elongated motor shaft journaled within and projecting from the free end of said stem, and a driving gear carried upon the distal end of said motor shaft, said driving structure normally being removably disposed within said compartment with its stem being slidingly received lengthwise of and within said bore; means carried by said frame for maintaining said stem in a mating relation with said bore thereby to position said two gears in mesh, one of said two gears being of electrical insulating material so as to cooperate with said stem in insulating said driving structure from said frame; a lower rotary shaft journaled in and extending lengthwise of said base; and driving means disposed within said standard compartment and connecting said upper and lower shafts for rotation in a fixed timing relationship, said lower shaft and said driving means being located entirely at one side of said motor casing so that the unitary structure may be inserted into and removed from said compartment by way of said base.

WILBUR J. PEETS.

REFERENCES CITED

The following references are of record in the file of this patent:

UNITED STATES PATENTS

| Number | Name | Date |
|---|---|---|
| 1,394,320 | Mace | Oct. 18, 1921 |
| 1,417,676 | Mace | May 30, 1922 |
| 1,462,516 | Mace | July 24, 1923 |
| 1,852,807 | Janssen | Apr. 5, 1932 |
| 1,916,860 | Hohmann | July 4, 1933 |
| 1,934,373 | Peets | Nov. 7, 1933 |
| 1,962,880 | Schwab et al. | June 12, 1934 |
| 1,975,744 | Goosman | Oct. 2, 1934 |
| 2,064,070 | Mapes et al. | Dec. 15, 1936 |
| 2,130,802 | Kisling | Sept. 20, 1938 |
| 2,207,251 | Guedon | July 9, 1940 |
| 2,318,442 | Way et al. | May 4, 1943 |

FOREIGN PATENTS

| Number | Country | Date |
|---|---|---|
| 636,409 | France | Jan. 11, 1928 |